US011669556B1

(12) United States Patent
Hasan et al.

(10) Patent No.: US 11,669,556 B1
(45) Date of Patent: Jun. 6, 2023

(54) METHOD AND SYSTEM FOR DOCUMENT RETRIEVAL AND EXPLORATION AUGMENTED BY KNOWLEDGE GRAPHS

(71) Applicant: Quantiphi Inc, Marlborough, MA (US)

(72) Inventors: Asif Hasan, Marlborough, MA (US); Vishal Vaddina, Mumbai (IN)

( * ) Notice: Subject to any disclaimer, the term of this patent is extended or adjusted under 35 U.S.C. 154(b) by 32 days.

(21) Appl. No.: 17/562,235

(22) Filed: Dec. 27, 2021

(51) Int. Cl.
*G06F 16/00* (2019.01)
*G06F 16/332* (2019.01)
*G06F 16/338* (2019.01)
*G06N 5/02* (2023.01)

(52) U.S. Cl.
CPC ........ *G06F 16/3328* (2019.01); *G06F 16/338* (2019.01); *G06N 5/02* (2013.01)

(58) Field of Classification Search
CPC .................................. G06F 16/3328
See application file for complete search history.

(56) References Cited

U.S. PATENT DOCUMENTS

2017/0193393 A1  7/2017  Contractor et al.
2018/0150522 A1* 5/2018  Moskwinski ..... G06F 16/24575

FOREIGN PATENT DOCUMENTS

CN    112035708 A    12/2020

* cited by examiner

*Primary Examiner* — Ajith Jacob
(74) *Attorney, Agent, or Firm* — RC Trademark Company

(57) ABSTRACT

The present invention discloses a system comprising a server and a database storing data pertaining to a plurality of electronic documents, wherein the server is configured to: send a list including one or more electronic documents to a client device for presentation to a user, wherein the list enables the user to select one of the one or more electronic documents; upon selection of a given electronic document from the one or more electronic documents, retrieve data pertaining to the given electronic document from the database, wherein the retrieved data indicates entities and their inter-relationships; generate a document knowledge graph representing the entities and their inter-relationships as specific to the given document, wherein the document knowledge graph is user controllable; and send the document knowledge graph to the client device for presentation to the user, generate and provide an interface that includes the generated document knowledge graph, wherein the document knowledge graph enables the user to selectively look into a specific entity or interrelationship.

19 Claims, 8 Drawing Sheets

METHOD AND SYSTEM FOR DOCUMENT RETRIEVAL AND EXPLORATION AUGMENTED BY KNOWLEDGE GRAPHS

TECHNICAL FIELD

The present disclosure relates generally to systems for document retrieval and presentation of data related to document. Moreover, the present disclosure also relates to methods for document retrieval and presentation of data related to document.

BACKGROUND

With the advent of information technology, the amount of data available is ever-increasing. Users can access a vast volume of information available on the Internet. The information available via the internet platforms is enormous and provided in scattered manner. Exhaustive inspection is required to extract information of interest in a particular domain. The user invests huge amount of time and energy to extract relevant information. Moreover, a lot of manual effort is involved to employ the gathered information into a useful representation.

The conventional systems identify and display information in response to a given search request. The search systems in existence, provide information via the documents presented to the user. However, such systems have limitations in search and analysis to produce relevant information. Such systems may provide false hits by identifying documents that are not actually of interest to the user or may miss identifying documents that are of actual interest to the user. The user needs to access the information manually, to identify relevant information, that requires enormous effort and time. Moreover, the user cannot give attention to the bunch of new documents published constantly, even when attempting to identify relevant information of interest.

Furthermore, conventional systems may fail to identify and suggest connections between entities involved in the documents, provide significance of one document over another document, explore all the searched documents together, get answers from the documents extracted in order to address a query of the user, etc. Thus, there arises a need for techniques to build systems that facilitates the user to utilize the information of the documents in a useful manner. Systems that can cater to above-mentioned problems are difficult to build. This presents a significant and persistent problem in need of a solution.

Therefore, in light of the foregoing discussion, there exists a need to overcome the aforementioned drawbacks associated with techniques for identifying relevant information.

SUMMARY

An object of the present disclosure is to provide a system for document retrieval and presentation of data related to document. Another object of the present disclosure is to provide a method for document retrieval and presentation of data related to document. Moreover, the present disclosure also seeks to provide a solution to the aforementioned existing problems in the prior art.

In one aspect, an embodiment of the present disclosure provides a system, wherein the system comprises a server and a database storing data pertaining to a plurality of electronic documents, wherein the server is configured to:

send a list including one or more electronic documents to a client device for presentation to a user, wherein the list enables the user to select one of the one or more electronic documents;

upon selection of a given electronic document from the one or more electronic documents, retrieve data pertaining to the given electronic document from the database, wherein the retrieved data indicates entities and their inter-relationships;

generate a document knowledge graph representing the entities and their inter-relationships as specific to the given document, wherein the document knowledge graph is user controllable;

send the document knowledge graph to the client device for presentation to the user; and generate and provide an interface that includes the generated document knowledge graph, wherein the document knowledge graph enables the user to selectively look into a specific entity or interrelationship.

In another aspect, the present disclosure provides a computer-implemented method for generating a customized knowledge graph for an application, the computer-implemented method comprising:

sending a list including the one or more electronic documents to the client device for presentation to the user, wherein the list enables the user to select one of the one or more electronic documents;

upon selecting a given electronic document from the one or more electronic documents, retrieving data pertaining to the given electronic document from the database, wherein the retrieved data indicates the entities and their inter-relationships;

generating a document knowledge graph representing the entities and their inter-relationships as specific to the given document, wherein the document knowledge graph is user controllable;

sending the document knowledge graph to the client device for presentation to the user; and generating and providing an interface that includes the generated document knowledge graph, wherein the document knowledge graph enables the user to selectively look into a specific entity or interrelationship.

In yet another aspect, the present disclosure provides a computer program product, the computer program product comprising a non-transitory machine-readable data storage medium, when accessed by a server, cause the server to:

send a list including the one or more electronic documents to the client device for presentation to the user, wherein the list enables the user to select one of the one or more electronic documents;

upon selection a given electronic document from the one or more electronic documents, to retrieve data pertaining to the given electronic document from the database, wherein the retrieved data indicates the entities and their inter-relationships;

generate a document knowledge graph representing the entities and their inter-relationships as specific to the given document, wherein the document knowledge graph is user controllable;

send the document knowledge graph to the client device for presentation to the user; and generate and provide an interface that includes the generated document knowledge graph, wherein the document knowledge graph enables the user to selectively look into a specific entity or interrelationship.

Embodiments of the present disclosure substantially eliminate or at least partially address the aforementioned problems in the prior art and enable an efficient manner of exploring documents related to a given technical field. The information presented to the user via knowledge graphs enables the users to interact with the information provided in an efficient manner.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
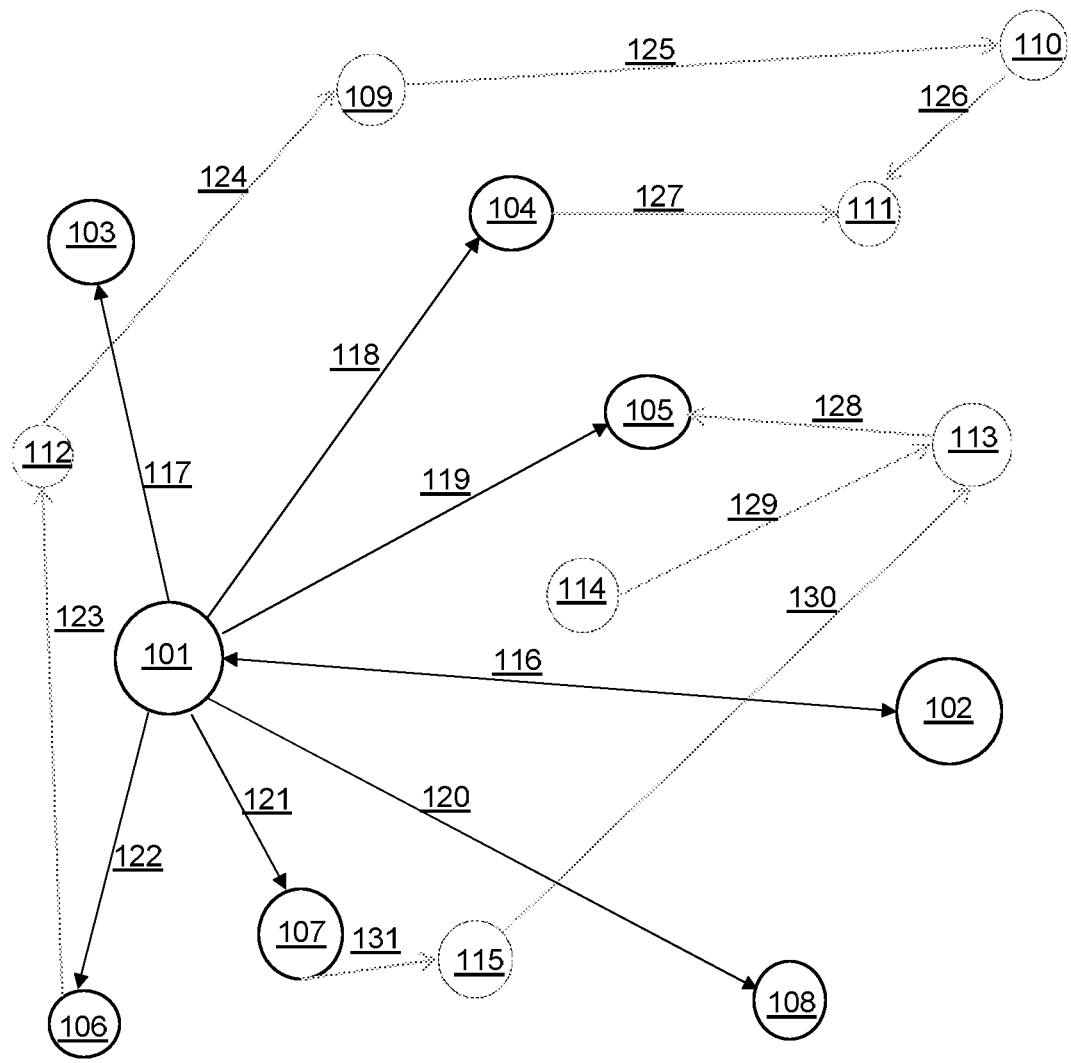
FIG. 1 is a schematic illustration of a document knowledge graph, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system wherein the system comprises a server and a database storing data pertaining to a plurality of electronic documents, wherein the server is configured to:
   send a list including one or more electronic documents to a client device for presentation to a user, wherein the list enables the user to select one of the one or more electronic documents;
   upon selection of a given electronic document from the one or more electronic documents, retrieve data pertaining to the given electronic document from the database, wherein the retrieved data indicates entities and their inter-relationships;
   generate a document knowledge graph representing the entities and their inter-relationships as specific to the given document, wherein the document knowledge graph is user controllable;
   send the document knowledge graph to the client device for presentation to the user; and
   generate and provide an interface that includes the generated document knowledge graph, wherein the document knowledge graph enables the user to selectively look into a specific entity or interrelationship.

In another aspect, the present disclosure provides a computer-implemented method for generating a customized knowledge graph for an application, the computer-implemented method comprising:
   sending a list including the one or more electronic documents to the client device for presentation to the user, wherein the list enables the user to select one of the one or more electronic documents;
   upon selecting a given electronic document from the one or more electronic documents, retrieving data pertaining to the given electronic document from the database, wherein the retrieved data indicates the entities and their inter-relationships;
   generating a document knowledge graph representing the entities and their inter-relationships as specific to the given document, wherein the document knowledge graph is user controllable;
   sending the document knowledge graph to the client device for presentation to the user; and
   generating and providing an interface that includes the generated document knowledge graph, wherein the document knowledge graph enables the user to selectively look into a specific entity or interrelationship.

In yet another aspect, the present disclosure provides a computer program product, the computer program product comprising a non-transitory machine-readable data storage medium, when accessed by a server, cause the server to:
   send a list including the one or more electronic documents to the client device for presentation to the user, wherein the list enables the user to select one of the one or more electronic documents;
   upon selection a given electronic document from the one or more electronic documents, to retrieve data pertaining to the given electronic document from the database, wherein the retrieved data indicates the entities and their inter-relationships;
   generate a document knowledge graph representing the entities and their inter-relationships as specific to the given document, wherein the document knowledge graph is user controllable;
   send the document knowledge graph to the client device for presentation to the user; and generate and provide an interface that includes the generated document knowledge graph, wherein the document knowledge graph enables the user to selectively look into a specific entity or interrelationship.

The aforementioned method and system enable an accurate and reliable search, identification, retrieval and presentation of documents to a user based on a user's search request. Pursuant to embodiments of the present disclosure there is provided an efficient manner of exploring documents related to a given technical field. The information presented to the user via knowledge graphs enables the users to interact with the information provided in an efficient manner.

The technical field of the document refers to the domain to which the document pertains. In this regard, the technical field may, for example, include any of: medical domain, finance domain, insurance domain, engineering domain or the like.

Throughout the present disclosure, the term "search query" as used herein, refers to input text provided by the user via a client device. The term "client device" refers to a device executing an application, program, or process that acquires information or services from a user, another application, program, process, or device (for example, a server) on a data communication network. The client device is a combination of software and hardware components. The client device allows the user (such as an individual and/or organization) to enter the search query. In an example, the client device can be implemented using but not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, a server, and Network-Attached Storage (NAS) devices. The user enters the plurality of search queries corresponding to the information required by the user. In an example, the user enters a search query such as 'Origin, transmission, diagnosis and management of coronavirus disease 2019 (COVID-19)' on a personal computer to obtain information related to COVID-19 required by the user. Furthermore, the client device comprises a memory, a display interface, a processor and so forth.

Moreover, the display interface is a structured set of user-interface elements rendered on a display screen of the client device. The display interface is optionally generated by any collection or set of instructions executable by an associated computing device. Additionally, the display interface is operable to interact with the user to convey graphical and/or textual information and receive input/search query from the user. Specifically, the display interface used herein is a graphical user-interface (GUI). Furthermore, elements of the display interface refer to visual objects that have a size and position within the display interface. A display interface element may be visible, though there may be times when the display interface element is hidden or overlaid on other display interface elements. Examples of display interface elements may include, but are not limited to, text blocks, input area, labels, text boxes, list boxes, lines, images windows, dialog boxes, frames, panels, menus, buttons, icons. In addition to size and position, display interface elements may have other properties, such as a margin, spacing, and the like. In an embodiment, the client device comprises display interface for rendering at least first user-interface and second user-interface.

Optionally, the server is configured to:
obtain, from the client device, a search query provided by the user;
process the search query to identify entities indicated in the search query; and
crawl the database to identify the one or more electronic documents that mention the identified entities.

In an embodiment, the server is configured to obtain, from the client device, a search query provided by the user. In another embodiment, the system is configured to process the search query to identify entities indicated in the search query. In this regard, pronoun references of a given entity in the search query are resolved using coreference resolution techniques. In this regard, the resolved text is then shared with a relation-extraction pipeline, which results in subject-relation-object triplets. Subsequently, from the triplets, entities (subjects and objects) are subjected to the process of Entity-Linking & Entity-Resolution.

Optionally, once the entities are identified, semantic interrelationships between the identified entities are identified using relation extraction techniques. An example of such a technique can be an open source framework, namely, Relation Extraction Learning framework, that facilitates the development and evaluation of relation extraction systems over text collections.

The system comprises a server. The system may also comprise more than one server. Throughout the present disclosure, the term "server" generally refers to a device executing an application, program, or process in a client/server relationship that responds to requests for information or services by another application, program, process or device (namely, a client) on a data communication network.

Moreover, optionally, in an embodiment, the server is further configured to crawl the database to identify one or more electronic documents that mention the semantic description of identified entities and relations between identified entities. Optionally, the server is configured to employ a crawler to crawl the database based on the search query provided by the user. For example, for the search query "Origins of CoV in bats, in China, before 2002", semantic search would consider the entire sentence, rather than searching for and retrieving all the docs that has a mention of "Coy", "bats", "origins", "China", "2002" etc. In this regard, a data crawler is beneficially employed so as to access data stored in databases by crawling the content directly from the database and serving the content. In an example implementation, in order to access electronic documents in a database, search engine indexing is employed. Search engine indexing is the collecting, parsing, and storing of data (electronic documents) to facilitate fast and accurate information retrieval from the electronic documents. In an embodiment the semantic search is done using ElasticSearch, where documents are embedded using Language-Model encodings and the encoding-vectors are indexed into ElasticSearch. In an embodiment when a user inputs a search query, the entire search-query gets indexed using the same encoding algorithm as above, and then the respective documents (top-n) with highest matching-scores between the 2 encoding vectors are selected. In an embodiment, when the user selects a given document, the crawler crawls the information related to the selected document from the database. Optionally, the crawler fetches the related information (document ids) to display it to the user.

Moreover, the server refers to a processor. Herein, the 'processor' refers to a structure and/or module that includes programmable and/or non-programmable components configured to store, process and/or share information and/or signals relating to the search string. The processor may be a controller having elements, such as a display, control buttons or joysticks, processors, memory and the like. Typically, the processor is operable to perform one or more operations for ranking the items in the list in view of request. In the present examples, the processor may include components such as memory, a processor, a network adapter and the like, to store, process and/or share information with other computing components, such as a user device, a remote server unit, a database.

Furthermore, the server is configured to send a list including the one or more electronic documents to the client device for presentation to the user, wherein the list enables the user to select one of the one or more electronic documents. Upon selection of a given document from the one or more electronic documents, the server is further configured to retrieve data pertaining to the given electronic document from the database, wherein the retrieved data indicates the entities and their inter-relationships.

The server is configured to generate and display a document knowledge graph representing the entities and their inter-relationships as specific to the given document, wherein the display of the document knowledge graph is user controllable. Optionally, in this regard, a given graph is generated by linking the identified entities according to the identified semantic inter-relationships between them. In the given graph, the entities are represented by nodes of the given graph, while the semantic inter-relationships between the entities are represented by edges (namely, links) between the nodes.

Optionally, the aforementioned graph is stored in the database associated with the server. Alternatively, optionally, the aforementioned graph is stored in the data memory associated with the processor of the server arrangement. Optionally, in such a case, the aforementioned graphs are stored in a form of JavaScript Object Notation (JSON). JSON is an open standard file format and data interchange format that uses human-readable text to store and transmit data objects consisting of attribute-value pairs and arrays (or other serializable values). It is a common data format with diverse uses in electronic data interchange, including that of web applications with servers. In an embodiment, for importing a knowledge graph, a previously exported JSON file is imported. In an embodiment, for exporting a knowledge graph, a JSON file consisting of the data and states of all the graph elements is exported.

Optionally, the processor includes any arrangement of physical or virtual computational entities capable of enhancing information to perform various computational tasks. Further, it will be appreciated that the remote server may be implemented as a hardware server and/or plurality of hardware servers operating in a parallel or in a distributed architecture. Optionally, the processor is supplemented with additional computation system, such as neural networks, and hierarchical clusters of pseudo-analog variable state machines implementing artificial intelligence algorithms. In an example, the processor may include components such as a memory, a data communication interface, a network adapter and the like, to store, process and/or share information with other computing devices, such as the processor, the database, a user device.

Optionally, the server is configured to dynamically modify the display of the document knowledge graph based on a selection received as a user input, where the selection comprises any of: toggling a node off, left click on a node, right click on a node, selecting a node, selecting an edge, hovering over a node, hovering over an edge. The information displayed to the user may include information relating to at least one of: entity type, entity subtype, list of first-degree connections, list of other connections. By "dynamically modify" it is meant that the document knowledge graph presented to the user can be controlled by the user so as to display a specific information based on a selection thereof. In an example implementation, the knowledge graph may be dynamically modified to display information related to a node. For example, when a user interacts with the knowledge graph by hovering over a node, the knowledge graph is modified to highlight the node and its connected edges and nodes. In another example implementation, when a user interacts with the knowledge graph by hovering over an edge, the knowledge graph is modified to highlight the edge along with its source and target nodes. Feature of left click on a node/edge, selects the node and highlights all its first-degree and second-degree connections, hiding all other elements. Feature of right click on a node/edge, displays the pop-ups of all the nodes connected to the clicked node. Feature of each click on any node displays one-more-degree at a time. For example, left-clicking on each or any node of the 1st degree connections of a node would in-turn reveal the 1st degree connections of the left-clicked node, if any. The first degree connections refers to connections that are directly related to the selected node. The second-degree connections are connections that are related to first degree connections of the selected node. The term "connections" refers to entities. Optionally, the processor is implemented as a computer program that provides various services (such as database service) to other devices, modules or apparatus. Moreover, the processor refers to a computational element that is operable to respond to and processes instructions to perform the ranking of items in the list in view of the request. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, Field Programmable Gate Array (FPGA) or any other type of processing circuit, for example as aforementioned.

Additionally, the processor is arranged in various architectures for responding to and processing the instructions for the search string to find relevant results therefor via the method or system. Herein, the system elements may communicate with each other using a communication interface. The communication interface includes a medium (e.g., a communication channel) through which the system components communicate with each other. Examples of the communication interface include, but are not limited to, a communication channel in a computer cluster, a Local Area Communication channel (LAN), a cellular communication channel, a wireless sensor communication channel (WSN), a cloud communication channel, a Metropolitan Area Communication channel (MAN), and/or the Internet. Optionally, the communication interface comprises one or more of a wired connection, a wireless network, cellular networks such as 2G, 3G, 4G, 5G mobile networks, and a Zigbee connection.

The system further comprises a database configured to store data pertaining to a plurality of electronic documents. Hereinabove, the term "database" refers to database servers related to a plurality of digital libraries that publish technical documents authored by various researchers or research organizations.

The present disclosure also provides a computer-readable storage medium comprising instructions which, when executed by a computer, cause the computer to carry out the steps of the system for ranking the items in the list in view of request. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Throughout the present disclosure the phrase "plurality of electronic documents" refers to all the published technical documents authored or co-authored by the at least one of the one or more researchers that are available in the public domain, and therefore, represent the research work of the one or more researchers. The term "other documents" refers to all the documents related to the given electronic document, in terms of similarity with entity details (type), published by the at least one of the one or more researchers that are available in the public domain. The published technical documents may, for example, be pre-clinical reports, clinical reports, scientific articles, thesis, granted patents, published patent applications and so on. Moreover, the electronic document can be one or more of a research paper, a journal, a technical document, an article, a legal document and the like. Typically, the electronic document relates to any machine readable or non-machine readable information (later converted to machine readable information) that may be required to be analyzed and detected by the system. Furthermore, the term "document" refers to a set of files in which an observation made in a scientific investigation or experiment is recorded, wherein the observation can be recorded in a form of one or more types of data. Some examples of various types of data are text data, tabular data, image data, video data and audio data. Thus, files can be in any suitable file formats depending upon the type of data that is stored therein. As an example, the set of files could comprise a single file having one or more of: a written text, one or more tables, one or more graphs, or a set of images. As another example, the set of files could comprise a plurality of files having different types of data, for example, such as a written text, one or more tables, one or more graphs, a set of images, one or more videos, or one or more audio clips.

When processing a given electronic document, different sections of the given electronic document are identified and at least one of the different sections of the given other document is further processed to identify the entities and the semantic inter-relationships specific to the research work. It will be appreciated that technical documents typically have well-defined sections that can be identified from their respective headings, and therefore, it is possible to select at least one of these sections for further processing. As an example, a scientific report related to an experiment may include various sections having suitable headings, for example, such as 'Abstract', 'Introduction', 'Materials and Methods', 'Results', 'Discussion', 'Conclusion' and 'References'. In such a case, the section(s) 'Abstract' and/or 'Conclusion' may be further processed to identify entities and semantic inter-relationships mentioned in the scientific report. As another example, a patent document typically includes sections having headings, for example, such as 'Abstract', 'Background', 'Summary', 'Brief Description of Drawings', 'Detailed Description' and 'Claims'. In such a case, the section(s) 'Abstract' and/or 'Claims' may be further processed to identify entities and semantic inter-relationships mentioned in the patent document.

Optionally, in order to obtain the plurality of electronic documents pertaining to given electronic document, the plurality of database servers are queried using keywords (namely, key strings). In an implementation, the search is a keyword search. In another implementation, the search is a conceptual search, for example by using frame semantic parsing techniques, that is employed to take into consideration the relevant entities and their inter-relationships, in accordance to the preferences of the user.

Optionally, when processing a given document, different sections of the given document are identified and at least one of the different sections of the given document is further processed to identify the entities and the semantic inter-relationships related to the technical field of the given document. Optionally, the electronic documents that are similar to the given electronic document are processed by employing a frame semantic parsing technique to generate corresponding semantic frames. Optionally, in such a case, sentences present in at least one section of each of the other documents are parsed and processed to generate the semantic frames. Optionally, these semantic frames form a part of the information indicative of the entities and the semantic inter-relationships related to the technical field.

Optionally, in the frame semantic parsing technique, sentences or phrases in a natural language are parsed and processed to generate semantic frames. In other words, lexical targets (namely, words and phrases) in their sentential contexts are processed to generate the semantic frames. Herein, the term "semantic frame" refers to a collection of facts or a coherent structure of related concepts that specify features that are typically associated with a particular word (for example, attributes, functions and interactions of a particular entity). In this regard, the knowledge graphs are generated from their corresponding semantic frames that have been generated using the aforementioned frame semantic parsing technique.

In an embodiment, the server is configured to refine the search query using an algorithm, wherein the algorithm used in refining the search query comprises at least one of: natural language processing, text analytics and machine learning techniques.

Optionally, the user query is refined to establish a refined set of one or more associated terms which is similar or related to the key term.

Optionally, the algorithm used in refining the search query comprises at least one of natural language processing, text analytics and machine learning techniques. Furthermore, natural language processing, text analytics and machine learning may be used in order to perceive contextual (namely, semantic, inferred) meaning of various words in the search query. Furthermore, aforementioned techniques analyse the words in the database in order to identify contextual meaning thereof. Moreover, co-occurrence of the words of the search query may be checked. Furthermore, co-occurrence of words present in the search query refers to use of the aforementioned words of the search query together in order to convey information. Additionally, optionally, the processing module is operable to refine the search query by employing the aforesaid algorithm. Furthermore, the processing module employs learning and/or a data mining technique on the search query in order to refine (such as, detecting misspellings) the search query.

Optionally, the algorithm used in refining the search query is based on the predefined syntax. Refining of the search query relates to removing unwanted information from the search query. Specifically, a processing module is configured to refine the search query using an algorithm, wherein the algorithm is based on the predefined syntax. The algorithm is stored in the processing module. In such a case, the processing module may comprise a memory unit for storing the algorithm therein. Optionally, the predefined syntax may be defined based on the entity information during defining of the algorithm.

Furthermore, the term "predefined syntax" used herein relates to an arrangement of various elements (such as words) in the search query. The processing module may use the algorithm having the predefined syntax to refine the search query to obtain the search query.

Optionally, the predefined syntax is defined by arrangement of the various elements with respect to punctuations. For example, a particular word arranged in a manner which is similar to the predefined syntax may be used to obtain the search query, whilst other words or phrases may be removed or added according to the predefined syntax.

In an embodiment, the system is configured to identify one or more electronic documents that mention the identified entities from the search query of the user, wherein identifying one or more electronic documents comprises document cleaning or processing. The document cleaning includes removal of hyperlinks, removal of citations and references, and removal of extra whitespaces from the documents.

In an embodiment, the system is configured to retrieve data pertaining to the given electronic document from the database, wherein the retrieved data indicates the entities and their inter-relationships. The retrieval of data includes coreference resolution, relation extraction, and entity linking. The term "coreference resolution" relates to the task of finding all expressions that refer to the same entity in a text. It is an important step for a lot of higher-level natural language processing (NLP) tasks that involve natural language understanding such as document summarization, question answering, and information extraction. Moreover, in coreference resolution, to derive the correct interpretation of a text, or even to estimate the relative importance of various mentioned subjects, pronouns and other referring expressions must be connected to the right individuals. Algorithms intended to resolve coreferences commonly look first for the nearest preceding individual that is compatible with the referring expression. In an embodiment, coreference resolution is done by AllenNLP library synergised with SpanBERT model. AllenNLP is a natural language processing platform for building state-of-the-art models. AllenNLP is a free, open-source project from AI2, built on PyTorch. Bidirectional Encoder Representations from Transformers (BERT) is an open source machine learning framework for natural language processing (NLP). BERT is designed to help computers understand the meaning of ambiguous language in text by using surrounding text to establish context. SpanBERT provides an improvement over BERT on several benchmarks. For example, SpanBERT is an improvement on the BERT model providing improved prediction of spans of text. Moreover, SpanBERT is a pre-training method that is designed to better represent and predict spans of text. Unlike BERT, SpanBERT performs following steps i) Masks contiguous random spans ii) Trains the span boundary representations to predict masked spans. The term "Relation extraction", relates to task that requires the detection and classification of semantic relationship mentions within a set of artifacts, typically from text or XML documents. In an embodiment, relation extraction employs Neural Information Extraction using OpenIE5 Rule Based system. An Open Information Extraction (Open IE) system runs over sentences and creates extractions that represent relations in text. In another embodiment, OpenIE6 is employed over OpenIE5. The BERT model is trained on the biomedical data which is then fine-tuned using the Open 1E6 methodology. The advantages of OpenIE6 over OpenIE5 are that it helps the model to derive semantic knowledge from the text and excels on simple as well as complex sentences and tackles conjunctions in a better way.

In natural language processing, the term "entity resolution", also referred to as entity linking, is the task of assigning a unique identity to entities (such as famous individuals, locations, or companies) mentioned in text. Moreover, in entity linking, words of interest (names of persons, locations and companies) are mapped from an input text to corresponding unique entities in a target knowledge base. Words of interest are called named entities (NEs), mentions, or surface forms.

In an embodiment, the entity linking employs text based models. For example, the Brute Force Entity Linking and BM25. In information retrieval, BM25 (BM is an abbreviation of best matching) is a ranking function used by search engines to estimate the relevance of documents to a given search query. The BM 25 builds upon the TF-IDF algorithm. In information retrieval, the terms "tf-idf", or "TF*IDF", or "TFIDF" refers to term frequency-inverse document frequency, that is a numerical statistic intended to reflect how important a word is to a document in a collection or corpus. BM-25 has improvements over Aliases.

In an embodiment, the entity linking employs language models. For example, with the aid of SapBERT and BioBERT, embeddings for all entities and aliases are created using both contextualised and non-contextualized techniques. The term "SapBERT" refers to Self-Alignment Pretraining for Biomedical Entity Representations. Despite the widespread success of self-supervised learning via masked language models (MLMs), accurately capturing fine-grained semantic relationships in the biomedical domain remains a challenge. This is of paramount importance for entity-level tasks such as entity linking where the ability to model entity relations (especially synonymy) is pivotal. To address this challenge, SapBERT is employed, that is a pretraining scheme that self-aligns the representation space of biomedical entities. BioBERT is one of the domain specific pre-trained MLMs. Moreover, in an embodiment, Soft Labels Approach is used for entity linking using Language Model Embeddings.

In an embodiment, the entity linking employs Fine Tuning Language Models. The Linear Fine-tuning is done using a Ridge Regression model and the Non-Linear Fine-tuning is done using Triplet Loss function. The Fine Tuning Language Models are employed for Non-linear fine tuning of SapBERT model in a contextualized manner.

In an embodiment, the system is configured to generate a knowledge graph representing the entities and their inter-relationships, wherein the generation of knowledge graph comprises relation and triplet canocalization. The term "triplet" refers to one connection between two entities in the knowledge graph. Moreover, a sentence is formed by the triplet of the selected edge and its source and target nodes. In an embodiment, for relation and triplet canonicalization the algorithms and techniques such as Clinical COVID BERT model is employed to embed relations, and DBSCAN Algorithm is employed for clustering relations and triplets.

In an embodiment, building knowledge graphs, employs Tools used for graph visualization. For example, Firebase Authentication that provides easy-to-use Software development kits (SDKs) and ready-made user-interface (UI) libraries to authenticate users to our application; Cytoscape.js that contains a graph theory model, optional renderer to display interactive graphs; Cytoscape-popper positioning engine; Tippy.js that is a complete tooltip, popover, dropdown, and menu solution; and Angular Material that is a Component infrastructure and material design components for Angular.

In an embodiment, the system is further configured to generate an open domain question answering platform (Q&A module) using dense passage retrieval (DPR) model. The steps involved for creation of the platform includes indexing of documents, query running and a reader to read the query. For indexing of documents the system is configured to encode documents based on language model. For estimated nearest neighbour search, it uses FAISS indexing. For query running, the DPR model employs three models context_encoder, question_encoder, and reader_model. These models are trained on open source datasets. The reader employs RoBERTa that is large fine tuned on squad2 for reading. The RoBERTa refers to 'A Robustly Optimized BERT Pretraining Approach'.

Optionally, the server is configured to:
retrieve data pertaining to other electronic documents from the database that mention the identified entities, wherein the retrieved data indicates the entities and their inter-relationships;
generate a document-document knowledge graph representing at least one of: entities and inter-relationships that are common between the given document and the other documents, an extent of overlap between the given document and the other documents, wherein the document-document knowledge graph is user controllable;
send the document-document knowledge graph to the client device for presentation to the user; and
generate and provide an interface that includes the generated document-document knowledge graph, wherein the document-document knowledge graph enables the user to selectively look into a specific entity or inter-relationship or a specific document.

Optionally, the server is configured to dynamically modify the document-document knowledge graph based on a selection received as a user input, where the selection comprises any of: toggling a node off, left click on a node, right click on a node, selecting a node, hovering over a node, hovering over an edge.

Moreover, optionally, the server is configured to determine a quantitative contextual importance that is indicative of a significance of each identified document to the search query.

The document-document knowledge graph comprises elements (intermediate nodes), which include papers, entities, authors, year or time of publication, details of journals.

There can be multiple document entities and authors (nodes) connected to any particular paper. However, a paper can have only one year of publication and journal node connected to it. In an embodiment, there is one journal node or year of publication (YOP) which is selected as default.

The degree of a node is determined by the number of nodes to which it is linked. In this regard, the parameter are calculated as follows:
a: sum of the degree of all papers connected to the particular document entity b: inverse of the degree of document-entity node $d_i$ $$a_i = \sum_{j=1}^{N} d(p_j \rightarrow d_i)$$

$$b_i = 1/d(d_i)$$

Calculating the harmonic mean between $a_i$ and $b_i$ gives the importance of the node $d_i$
Importance($d_i$)=HM($a_i$, $b_i$)=$2a_ib_i/(a_i+b_i)$, where HM refers to Harmonic Mean.

where N refers to number of papers connected to the node $d_i$. Optionally, the server is configured to determine a quantitative contextual importance that is indicative of a significance of each identified document-entity to the search query. The term "document-entity" is referred to as entity mentioned in the document.

In an example illustration, the search query inputted by the user is "What is Bat guano?", the quantified contextual importance score for document entities is calculated as follows:
Contextual-Importance($d_i$)=HM(Importance($d_i$), Similarity Score(Q, $d_i$)),
where Q is the search query being searched.

Optionally, $d_i$, can interchangeably represent author node A.

It will be appreciated that a domain-specific language model is employed to embed the query and the document-entity. Then, the similarity score between both these embeddings is calculated. A pre-defined number of document entity nodes are shortlisted that have the highest contextual important scores.

For example, based on the query asked we shortlist bat viruses, bats, coronavirus, bat guano, strains as the document entity nodes having the highest contextual important scores.

Optionally, the server is configured to provide a visual indication for the quantitative contextual importance of each identified document to the search query.

More optionally, the server is configured to provide a visual indication for the quantitative contextual importance of each identified document to the search query. In this regard, the nodes and/or the edges of the documents are highlighted in a different color to signify the quantitative contextual importance of each identified document to the search query. In this regard, different color schemes may be utilized to depict importance of a given electronic document.

In an embodiment, every document-entity $d_i$, can be connected to any number of papers. Similarly, every author node $A_i$ can be connected to any number of papers. Among these papers, the graph can display the top-n (say top-5) papers having the highest degree.

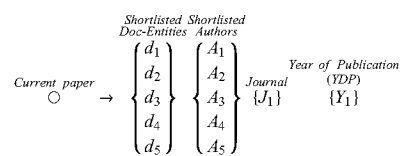

In an embodiment,
Papers-to-show ($d_i$)=Top-5 d ($p_i$->$d_i$),
Papers-to-show ($A_i$)=Top-5 d ($p_i$->$A_i$).
Similarly, the graph can display the top 5 papers having the highest degree, attached to the journal node and the YOP node.

$$\left\{\begin{matrix}P_{d1,1}\\P_{d1,2}\\P_{d1,3}\\P_{d1,4}\\P_{d1,5}\end{matrix}\right\}^{d_1}\left(\begin{matrix}P_{d2,1}\\P_{d2,2}\\P_{d2,3}\\P_{d2,4}\\P_{d2,5}\end{matrix}\right)^{d_2}\ldots\left\{\begin{matrix}P_{A1,1}\\P_{A1,2}\\P_{A1,3}\\P_{A1,4}\\P_{A1,5}\end{matrix}\right\}^{A_1}$$

These papers can be mutually inclusive. This means that $P_{d1,3}$ can be the same as $P_{A1,5}$.

In an embodiment, the user can visualize the Document-to-Document KG by having only the nodes (document-entities, authors etc.) having the highest importance scores. In turn, only the top 5 papers having the highest degree connected to each node are displayed.

In an embodiment, amongst these papers, the top 3 papers with the highest degree can be visualized as recommendations based on document entities. Similarly, the top 3 papers with the highest degree based on other metadata nodes can be visualized as recommendations as well.

In an embodiment, the user can visualize paper nodes or paper citations two hops away. Apart from the various intermediary nodes like document entities, authors, journal, and year of publication/time (YOP) which connect the central/current paper to other papers, the user also visualizes other paper nodes connecting a current paper to certain paper citations (paper citations 2 hops away from the current paper). After considering all paper citations that are 2 hops away from the current paper, the graph represents shortlisted the top-m (top-3) paper citations (paper nodes) having the highest degree.

In an embodiment, the recommendations are based on the document-entities. In this regard, papers recommended based on doc-entities={5 doc-entities*Top 5 papers each}=25 papers. Thus, the user obtains 25 papers based on doc-entities. Amongst these 25 papers, the top 3 papers with the highest degree are visualized as recommendations.

In an embodiment, the recommendations are based on the metadata. In this regard, papers recommended based on metadata={5 author nodes*Top 5 papers each}+{1 journal node*Top 5 papers}+{1 YOP/time node*Top 5 papers}+{Top 3 papers citations that are 2 hops away from the central paper}. Amongst all these papers, the top 3 papers with the highest degree are visualized as recommendations. The metadata nodes consists of authors, journal, year of publication as well as paper citations that are 2 hops away from the central paper.

In an embodiment, the server is configured to provide a list of electronic documents that are similar to the given electronic document.

Moreover, the present disclosure also relates to the method as described above. Various embodiments and variants disclosed above apply mutatis mutandis to the method.

Optionally, the method further comprises, dynamically modifying the document-to-document knowledge graph based on a selection received as a user input, where the selection comprises any of: toggling a node off, left click on a node, right click on a node, selecting an edge, hovering over a node, hovering over an edge.

Optionally, the method further comprises:
retrieving data pertaining to the other electronic document from the database that mention the identified entities, wherein the retrieved data indicates the entities and their inter-relationships;
generating a document-document knowledge graph representing at least one of: entities and inter-relationships that are common between the given document and the other documents, an extent of overlap between the given document and the other documents, wherein the document-document knowledge graph is user controllable;
sending the document-document knowledge graph to the client device for presentation to the user;
generating and providing an interface that includes the generated document-document knowledge graph, wherein the document-document knowledge graph enables the user to selectively look into a specific entity or interrelationship or a specific document.

Optionally, the method further comprises dynamically modifying the document-document knowledge graph based on a selection received as a user input, where the selection comprises any of: toggling a node off, left click on a node, right click on a node, selecting a node, hovering over a node, hovering over an edge.

Optionally, the method further comprises:
obtaining, from the client device, a search query provided by the user;
processing the search query to identify entities indicated in the search query; and
crawling the database to identify the one or more electronic documents that mention the identified entities.

Optionally, the method further comprises determining a quantitative contextual importance that is indicative of a significance of each identified document to the search query.

Optionally, the method further comprises providing a visual indication for the quantitative measurement of each identified document to the search query.

Optionally, the method further comprises refining the search query using an algorithm, wherein the algorithm used in refining the search query comprises at least one of: natural language processing, text analytics and machine learning techniques.

Optionally, the method further comprises providing a list of electronic documents that are similar to the given electronic document.

DETAILED DESCRIPTION OF DRAWINGS

Referring to FIG. 1, illustrated is a document knowledge graph, wherein nodes 101, 102, 103, 104, 105, 106, 107, 108, 109, 110, 111, 112,113, 114, 115 of the example document knowledge graph represent entities specific to the document selected by the user, while edges 116, 117, 118, 119, 120, 121, 122, 123, 124, 125, 126, 127, 128, 129, 130, 131 between the nodes represent semantic inter-relationships between the entities specific to the document. When the user left clicks on a node 101, the graph selects the node and highlights all its first and second degree connections.

Figure 2:
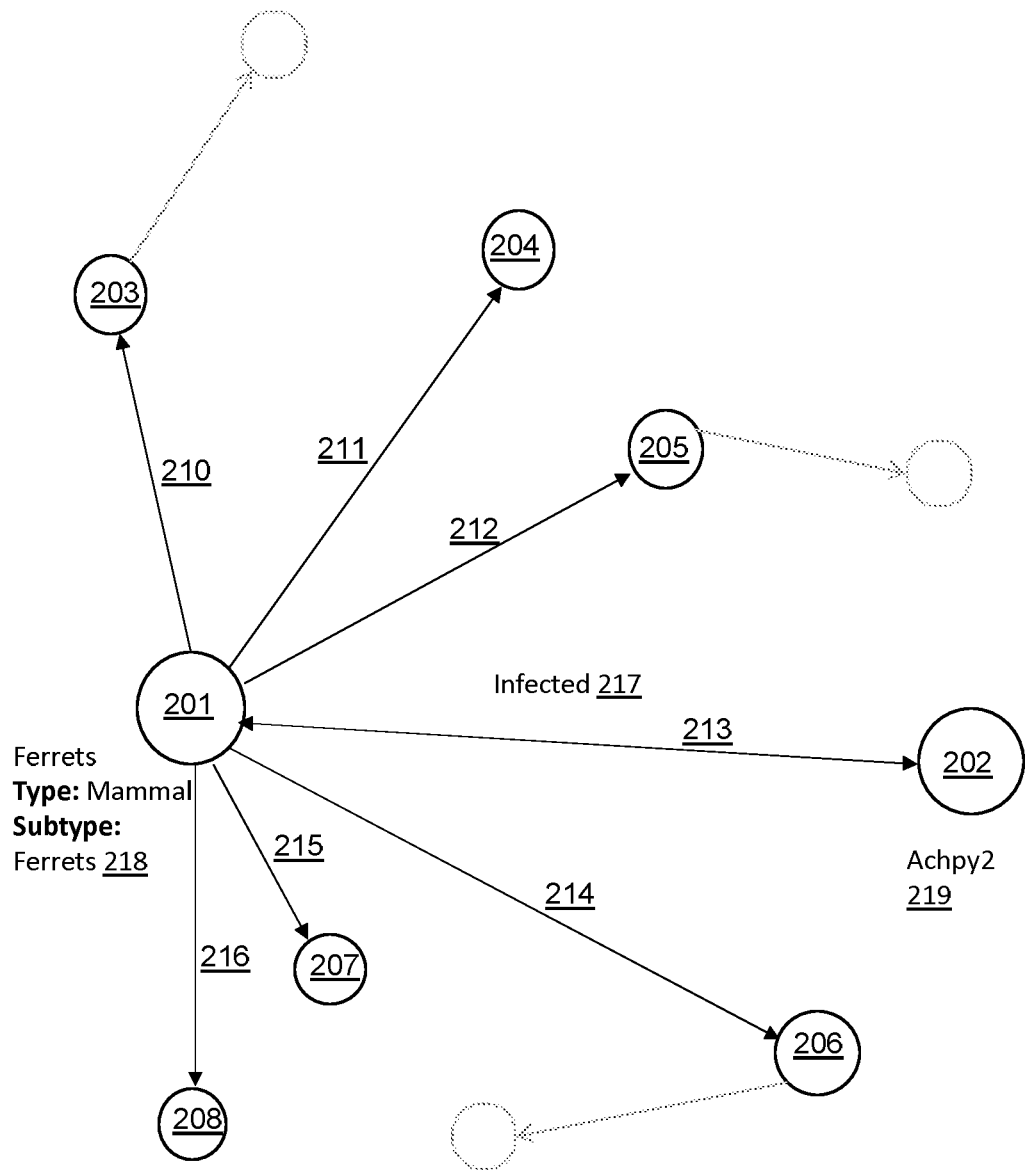
FIG. 2 represents a document knowledge graph, illustrating first degree connections of a node selected by the user, in accordance with an embodiment of the present disclosure.

FIG. 2 is a document knowledge graph, illustrating the first-degree connection of a node 201. When the user left clicks the node 201, the graph highlights the first-degree connections 202, 203, 204, 205, 206, and 207 and the second-degree connections available for nodes 203, 205, 206. When the user hovers over the edge 213, the node info 219 of node 202 and the edge-info or relation 217 of edge 213 are displayed in the graph.

Figure 3:
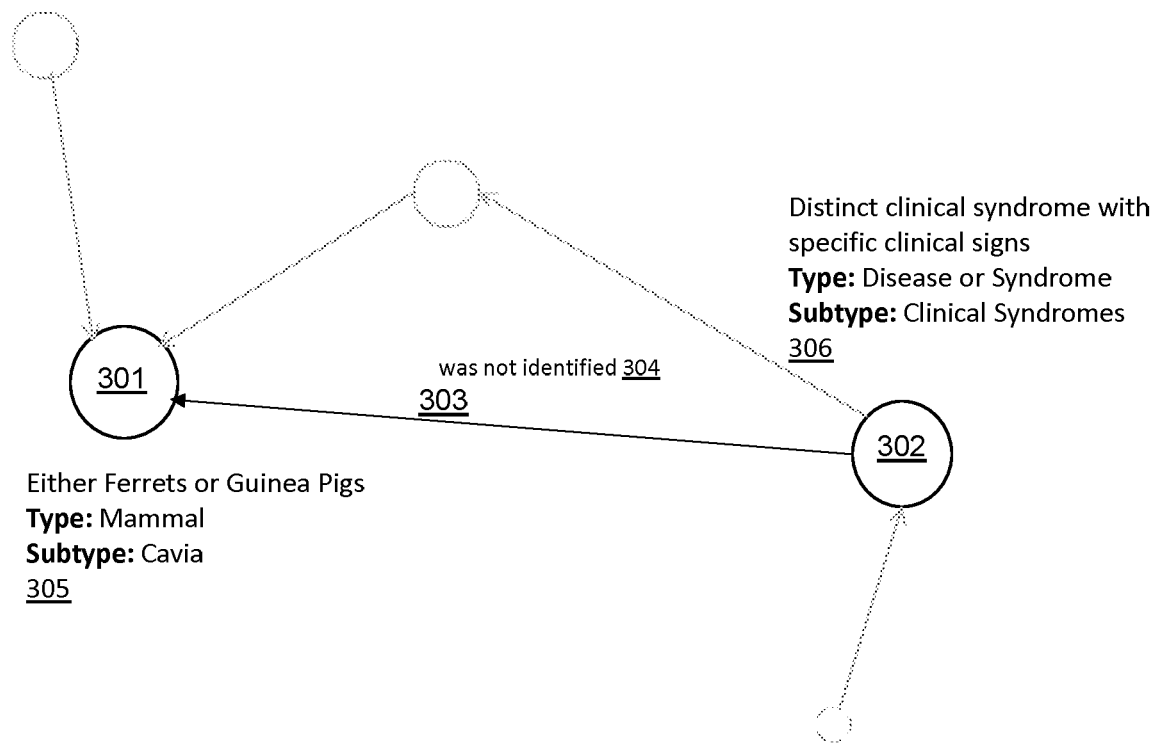
FIG. 3 represents a document knowledge graph, illustrating the relation card of an edge between nodes, in accordance with an embodiment of the present disclosure.

FIG. 3 is a document knowledge graph, illustrating the relation card of the edge 303 between nodes 301 and 302. When the user hovers on an edge 303, the graph highlights the edge along with its source 302 and target node 301. Furthermore, 305 represents the entity details of node 301, whereas 306 represents entity details of node 302. Moreover, 304 represents the relation card of the edge 303 between the nodes 301 and 302. The relation card 304 stating 'was not mentioned', represents the sentence formed by the triplet of the selected edge 303 and its source node 302 and target node 301. The sentence formed may be "Although there was evidence of mild malaise in infected ferrets (raised body temperature and weight loss), a distinct clinical syndrome with specific clinical signs 'was not identified' in either ferrets or guinea pigs".

Figure 4:
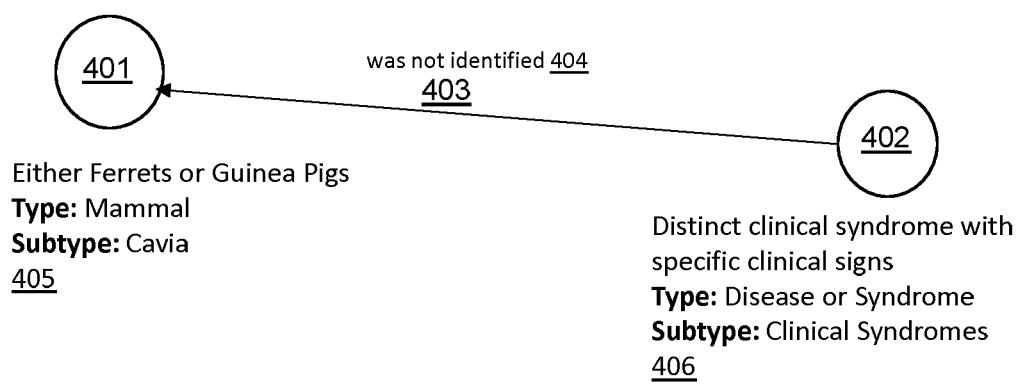
FIG. 4 represents a document knowledge graph, illustrating a triplet of the selected edge and its source node and target node, in accordance with an embodiment of the present disclosure.

FIG. 4 is a document knowledge graph illustrating a triplet of the selected edge 403 and its source node 402 and target node 401. When the user left clicks on an edge 403, the graph highlights the edge along with its source and target node, hiding the second-degree connections.

Figure 5:
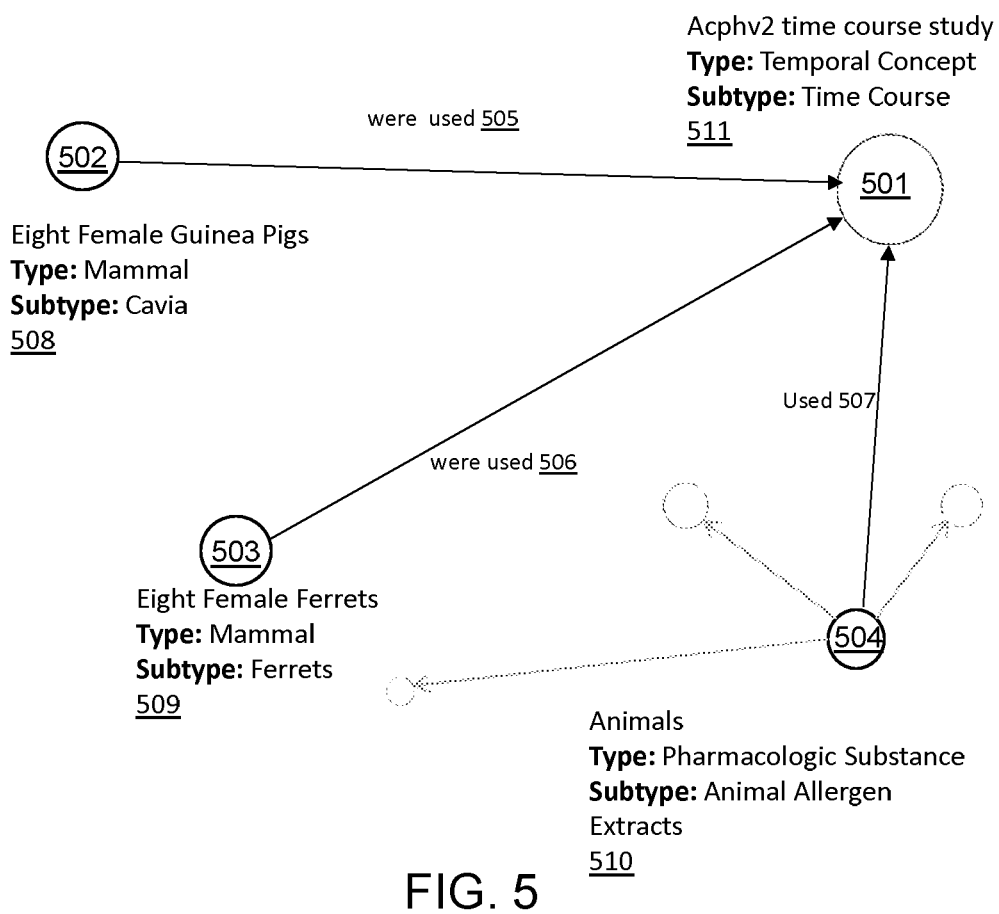
FIG. 5 represents a document knowledge graph, illustrating entities relationship for a node selected by the user according to a preference set by the user, in accordance with an embodiment of the present disclosure.

FIG. 5 is a document knowledge graph illustrating entities relationship for node 501. When the user sets preference for entity details as 511, via the user-interface, the primary connection nodes 502, 503, 504 with node 501 are represented by the graph. Furthermore, the graph illustrates that the relation card of all the edges is 'were used'/'used', as shown by 505, 506, 507.

Figure 6:
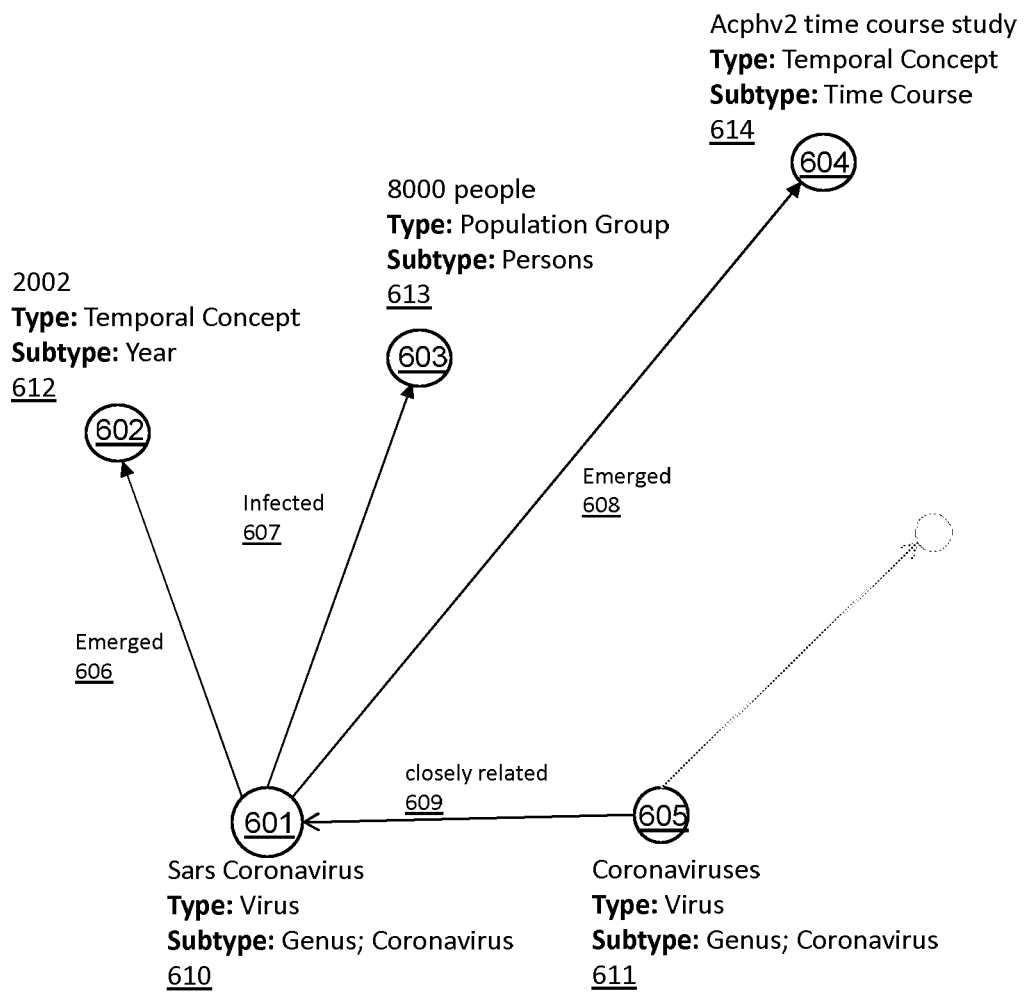
FIG. 6 represents a document knowledge graph, illustrating relations for node as selected by the user, in accordance with an embodiment of the present disclosure.

FIG. 6 is a document knowledge graph illustrating relations for a node 601. A user performs an entity-search, wherein the user can search for a specific entity and explore all the connections for the entity.

Figure 7:
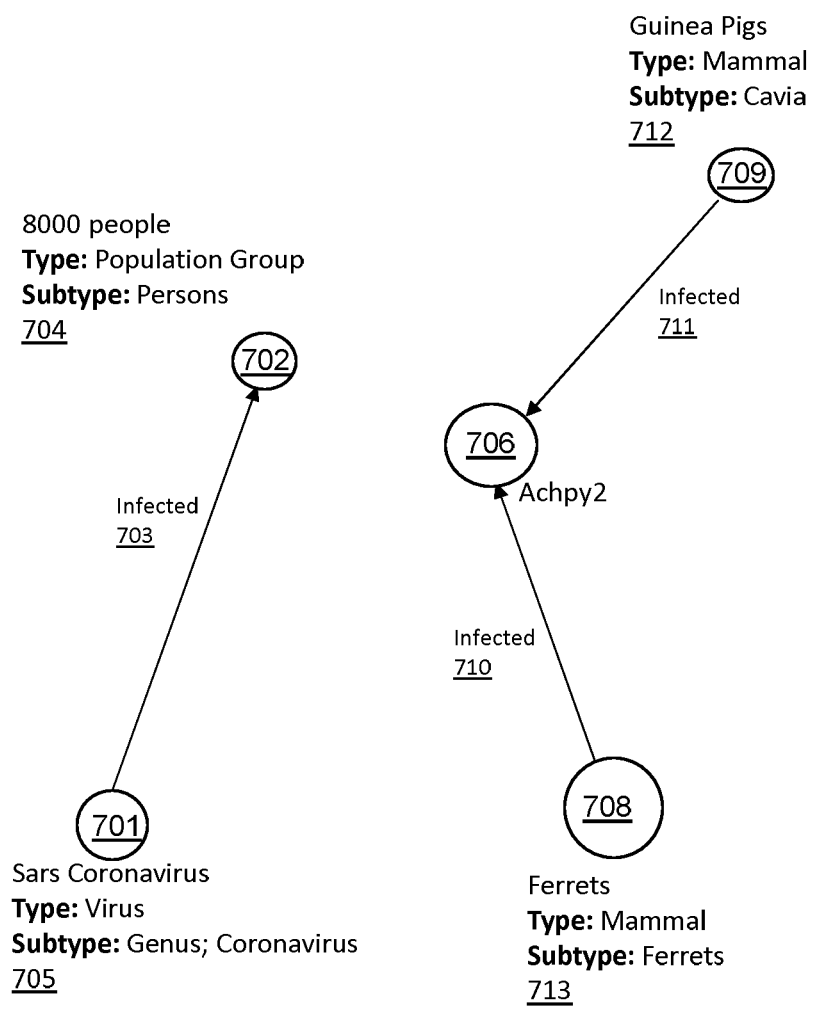
FIG. 7 represents a document knowledge graph, illustrating connections between node-pairs in accordance with a relation-search by the user, in accordance with an embodiment of the present disclosure.

FIG. 7 is a document knowledge graph illustrating nodes for a relation-search. In an example, as illustrated by FIG. 7, when the user performs a relation-search as "infected", a graph is presented with nodes 701, 702, 706, 708 and 709 having relation cards represented by 703, 710, 711.

Figure 8:
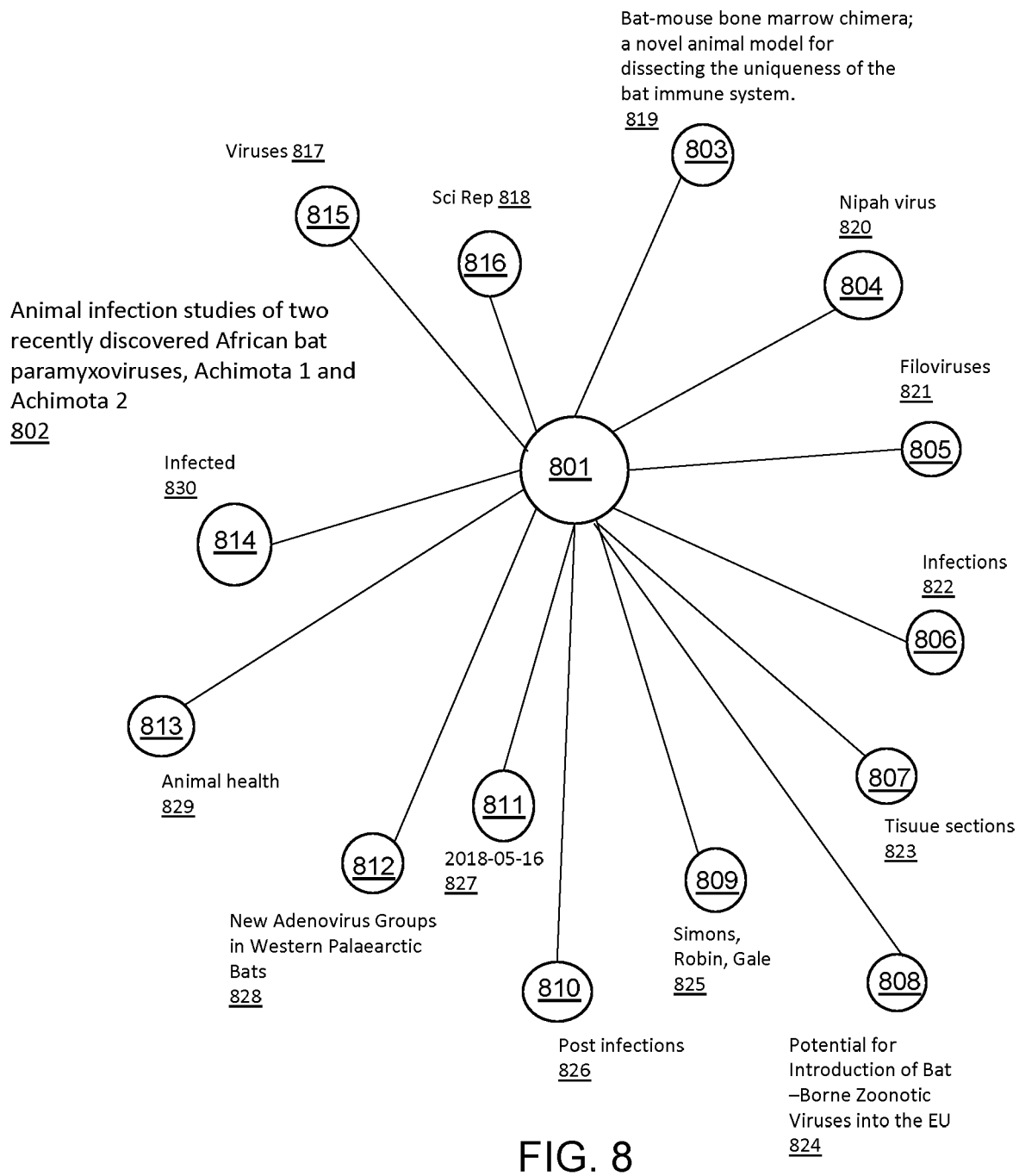
FIG. 8 represents a document-to-document graph, illustrating connections of a node selected by the user, with document-entities, journals, authors, related paper, suggested papers, and year/time of publication in accordance with an embodiment of the present disclosure.

FIG. 8 is a document-to-document knowledge graph illustrating entities relationship with other documents for node 801 selected by the user. The entity details of node 801 is shown by 802. Furthermore, different primary connections 804, 805, 806, 807, 810, 813, and 814 refer to different document-entities with connections shown by 820, 821, 822, 823, 826, 829, 830 respectively. The document-entities refer to key-entities of the document represented by the node 801. In an embodiment, the primary connections 815, 816 having node-info 817 and 818 respectively, refer to journals for the node 801. In an embodiment, the primary connection 803 having node-info 819 refers to a related paper for the node 801. In an embodiment, the primary connection 808 and 812 having node-info 824 and 828 respectively refer to suggested papers for the node 801. In an embodiment, the primary connection 809 having node-info 825 refer to authors for the node 801. In an embodiment, the primary connection 811 having node-info 827 refer to time/year of publication for the node 801.

The invention claimed i:

1. A system comprising a server and a database storing data pertaining to a plurality of electronic documents, wherein the server is configured to:
  send a list including one or more electronic documents to a client device for presentation to a user, wherein the list enables the user to select one of the one or more electronic documents;
  upon selection of a given electronic document from the one or more electronic documents, retrieve data pertaining to the given electronic document from the database, wherein the retrieved data indicates entities and their inter-relationships;
  generate a document knowledge graph representing the entities and their inter-relationships as specific to the given document, wherein the document knowledge graph is user controllable;
  send the document knowledge graph to the client device for presentation to the user; and
  generate and provide an interface that includes the generated document knowledge graph, wherein the document knowledge graph enables the user to selectively look into a specific entity or interrelationship.

2. The system according to claim 1, wherein the server is configured to dynamically modify the document knowledge graph based on a selection received as a user input, where the selection comprises any of: toggling a node off, left click on a node, right click on a node, selecting an edge, hovering over a node, hovering over an edge.

3. The system according to claim 1, wherein the server is configured to:
  retrieve data pertaining to other electronic documents from the database that mention the identified entities, wherein the retrieved data indicates the entities and their inter-relationships;
  generate a document-document knowledge graph representing at least one of: entities and inter-relationships that are common between the given document and the other documents, an extent of overlap between the given document and the other documents, wherein the document-document knowledge graph is user controllable;
  send the document-document knowledge graph to the client device for presentation to the user; and
  generate and provide an interface that includes the generated document-document knowledge graph, wherein the document-document knowledge graph enables the user to selectively look into a specific entity or inter-relationship or a specific document.

4. The system according to claim 3, wherein the server is configured to dynamically modify the document-document knowledge graph based on a selection received as a user input, where the selection comprises any of: toggling a node off, left click on a node, right click on a node, selecting a node, hovering over a node, hovering over an edge.

5. The system according to claim 1, wherein the server is configured to:
  obtain, from the client device, a search query provided by the user;
  process the search query to identify entities indicated in the search query; and
  crawl the database to identify the one or more electronic documents that mention the identified entities.

6. The system according to claim 5, wherein the server is configured to determine a quantitative contextual importance that is indicative of a significance of each identified document to the search query.

7. The system according to claim 5, wherein the server is configured to provide a visual indication for the quantitative contextual importance of each identified document to the search query.

8. The system according to claim 5, wherein the server is configured to refine the search query using an algorithm, wherein the algorithm used in refining the search query comprises at least one of: natural language processing, text analytics and machine learning techniques.

9. The system according to claim 1, wherein the server is configured to provide a list of electronic documents that are similar to the given electronic document.

10. A computer-implemented method for generating a customized knowledge graph for an application, the computer-implemented method comprising:
  sending a list including the one or more electronic documents to the client device for presentation to the user, wherein the list enables the user to select one of the one or more electronic documents;

upon selecting a given electronic document from the one or more electronic documents, retrieving data pertaining to the given electronic document from the database, wherein the retrieved data indicates the entities and their inter-relationships;

generating a document knowledge graph representing the entities and their inter-relationships as specific to the given document, wherein the document knowledge graph is user controllable;

sending the document knowledge graph to the client device for presentation to the user; and generating and providing an interface that includes the generated document knowledge graph, wherein the document knowledge graph enables the user to selectively look into a specific entity or interrelationship.

11. The computer-implemented method according to claim 10, further comprising, dynamically modify the document knowledge graph based on a selection received as a user input, where the selection comprises any of: toggling a node off, left click on a node, right click on a node, selecting an edge, hovering over a node, hovering over an edge.

12. The computer-implemented method according to claim 10, further comprising:

retrieving data pertaining to the other electronic document from the database that mention the identified entities, wherein the retrieved data indicates the entities and their inter-relationships;

generating a document-document knowledge graph representing at least one of: entities and inter-relationships that are common between the given document and the other documents, an extent of overlap between the given document and the other documents, wherein the document-document knowledge graph is user controllable;

sending the document-document knowledge graph to the client device for presentation to the user; and generating and providing an interface that includes the generated document-document knowledge graph, wherein the document-document knowledge graph enables the user to selectively look into a specific entity or interrelationship or a specific document.

13. The computer-implemented method according to claim 12, further comprising dynamically modify the document-document knowledge graph based on a selection received as a user input, where the selection comprises any of:

toggling a node off, left click on a node, right click on a node, selecting a node, hovering over a node, hovering over an edge.

14. The computer-implemented method according to claim 12, wherein the server is configured to:

obtaining, from the client device, a search query provided by the user;

processing the search query to identify entities indicated in the search query; and crawling the database to identify the one or more electronic documents that mention the identified entities.

15. The computer-implemented method according to claim 14, further comprising determining a quantitative contextual importance that is indicative of a significance of each identified document to the search query.

16. The computer-implemented method according to claim 15, further comprising providing a visual indication for the quantitative measurement of each identified document to the search query.

17. The computer-implemented method according to claim 14, further comprising refining the search query using an algorithm, wherein the algorithm used in refining the search query comprises at least one of: natural language processing, text analytics and machine learning techniques.

18. The computer-implemented method according to claim 10, further comprising providing a list of electronic documents that are similar to the given electronic document.

19. A computer program product, the computer program product comprising a non-transitory machine-readable data storage medium having stored thereon program instructions that, when accessed by a server, cause the server to:

send a list including the one or more electronic documents to the client device for presentation to the user, wherein the list enables the user to select one of the one or more electronic documents;

upon selection a given electronic document from the one or more electronic documents, to retrieve data pertaining to the given electronic document from the database, wherein the retrieved data indicates the entities and their inter-relationships;

generate a document knowledge graph representing the entities and their inter-relationships as specific to the given document, wherein the document knowledge graph is user controllable;

send the document knowledge graph to the client device for presentation to the user; and generate and provide an interface that includes the generated document knowledge graph, wherein the document knowledge graph enables the user to selectively look into a specific entity or interrelationship.

* * * * *